(12) United States Patent
Ogino (10) Patent No.: US 11,375,106 B2
(45) Date of Patent: Jun. 28, 2022

(54) IMAGE CAPTURE APPARATUS AND CONTROL METHOD THEREFOR

(71) Applicant: CANON KABUSHIKI KAISHA, Tokyo (JP)

(72) Inventor: Hiroshi Ogino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/995,409

(22) Filed: Aug. 17, 2020

(65) Prior Publication Data

US 2021/0058546 A1  Feb. 25, 2021

(30) Foreign Application Priority Data

Aug. 20, 2019  (JP) .............................. JP2019-150597

(51) Int. Cl.
| | |
|---|---|
| *H04N 5/232* | (2006.01) |
| *H04N 5/235* | (2006.01) |
| *H04N 5/355* | (2011.01) |
| *G06T 5/50* | (2006.01) |

(52) U.S. Cl.
CPC ..... *H04N 5/23216* (2013.01); *H04N 5/23229* (2013.01); *H04N 5/23293* (2013.01)

(58) Field of Classification Search
CPC .......... H04N 5/23216; H04N 5/23229; H04N 5/23293; H04N 5/23232; H04N 5/235; H04N 5/2352; H04N 5/2355; H04N 5/23555; H04N 5/355; H04N 5/35536; G06T 5/50; G06T 2207/20208; G06T 2207/10096; G09G 2320/0271; G09G 5/003; G09G 2320/0626; G09G 2354/00; G06K 9/4661
USPC ...... 348/207.1, 333.01, 333.02, 333.12, 362, 348/208.12, 221.1, 229.1, 353, 365, 673, 348/687; 382/274; 345/77, 617; 715/700, 762, 790
See application file for complete search history.

(56) References Cited

U.S. PATENT DOCUMENTS

| | | | | |
|---|---|---|---|---|
| 9,396,684 | B2 * | 7/2016 | Bi | G09G 3/3275 |
| 9,501,855 | B2 * | 11/2016 | Aiba | G09G 5/00 |
| 10,297,230 | B2 * | 5/2019 | Matsubayashi | H04N 5/232 |
| 2008/0204566 | A1 * | 8/2008 | Yamazaki | H04N 5/228 |
| | | | | 348/208.15 |

(Continued)

FOREIGN PATENT DOCUMENTS

JP    2015-159543 A    9/2015

OTHER PUBLICATIONS

The above U.S. documents were cited in a U.K. Search Report dated Dec. 21, 2020, that issued in the corresponding U.K. Patent Application No. 20188315.4.

Primary Examiner — Marly S Camargo
(74) Attorney, Agent, or Firm — Cowan, Liebowitz & Latman, P.C.

(57) ABSTRACT

An image capture apparatus comprises a first signal processing circuit that generates image data for display by applying signal processing for display to image data obtained from an image sensor and a second signal processing circuit that generates image data for recording by applying signal processing for recording to the image data obtained from the image sensor. The image capture apparatus further comprises a recording circuit that records, in association with the image data for recording, information from which settings of the signal processing for display can be identified.

14 Claims, 4 Drawing Sheets

(56) References Cited

U.S. PATENT DOCUMENTS

| | | | |
|---|---|---|---|
| 2015/0123955 A1* | 5/2015 | Bi | G09G 3/32 345/207 |
| 2015/0242986 A1* | 8/2015 | Yoshizawa | G06T 1/20 |
| 2015/0269882 A1* | 9/2015 | Kimpe | G09G 3/3208 |
| 2016/0189409 A1 | 6/2016 | Aiba et al. | |
| 2017/0064188 A1* | 3/2017 | Yoshida | H04N 5/23212 |
| 2017/0345392 A1 | 11/2017 | Matsubayashi | |
| 2018/0230578 A1* | 8/2018 | Srivastava et al. | H04N 5/232122 |

* cited by examiner

IMAGE DATA FOR RECORDING

IMAGE CAPTURE APPARATUS AND CONTROL METHOD THEREFOR

BACKGROUND OF THE INVENTION

Field of the Invention

The present invention relates to an image capture apparatus and a control method therefor.

Description of the Related Art

In recent years, there have been an increasing number of display devices and image capture apparatuses that support high dynamic range (hereinafter, HDR). To perform display, a display device that supports HDR converts a video signal level into display luminance in compliance with the Electro-Optical Transfer Function (EOTF) defined by the HDR standards. Meanwhile, an image capture apparatus that supports HDR generates a video signal (HDR signal) by converting an input luminance value into a video signal level in compliance with the Opto-Electronic Transfer Function (OETF) having a property that is the inverse of the EOTF. For example, the EOTF of ST.2084, which is one of the HDR standards, assigns scene luminance values (video signal levels) to an absolute display luminance range of up to 10000 nit (or $cd/m^2$) (Japanese Patent Laid-Open No. 2015-159543). Furthermore, BT.2020, which is the 4K/8K UHD broadcast standard utilizing HDR signals, defines Rec.2020 with a larger color gamut than conventional ones.

As a high-image-quality image format of HDR images and the like becomes widespread, a display apparatus used in an image capture apparatus and the like is also expected to display images with high image quality. With an increase in the image quality of images displayed on a display apparatus, a photographer is expected to, for example, set image quality for shooting while checking images displayed on a display apparatus of an image capture apparatus.

However, for example, when an image capture apparatus performs so-called live-view display or image playback, development processing for display may be performed separately from development processing for recording. For example, for the purpose of reducing power consumption, there is a case where development processing for display is made simpler than development processing for recording.

In this case, if a recorded image is displayed on a display apparatus that is different from a display apparatus of an image capture apparatus, the displayed image may differ in luminance and color from an image that was displayed on the display apparatus of the image capture apparatus during shooting. Consequently, there is a possibility that a user develops a feeling of inconsistency, and wishes to attain the luminance and color that were displayed during shooting.

SUMMARY OF THE INVENTION

The present invention provides a technique in which, even when an image that was recorded by an image capture apparatus is displayed on a display apparatus that is different from a display apparatus of the image capture apparatus, the luminance and color that are similar to those displayed on the display apparatus of the image capture apparatus are reproduced.

According to an aspect of the present invention, there is provided an image capture apparatus, comprising: a first signal processing circuit that generates image data for display by applying signal processing for display to image data obtained from an image sensor; a second signal processing circuit that generates image data for recording by applying signal processing for recording to the image data obtained from the image sensor; and a recording circuit that records, in association with the image data for recording, information from which settings of the signal processing for display can be identified.

According to another aspect of the present invention, there is provided a control method for an image capture apparatus, the control method comprising: generating image data for display by applying signal processing for display to image data obtained from an image sensor; generating image data for recording by applying signal processing for recording to the image data obtained from the image sensor; and recording, in association with the image data for recording, information from which settings of the signal processing for display can be identified.

According to a further aspect of the present invention, there is provided a non-transitory computer-readable medium that stores a program causing, when executed by a computer included in an image capture apparatus, to preform a control method of the image capture apparatus, the control method comprising: generating image data for display by applying signal processing for display to image data obtained from an image sensor; generating image data for recording by applying signal processing for recording to the image data obtained from the image sensor; and recording, in association with the image data for recording, information from which settings of the signal processing for display can be identified.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

Note that the following embodiments will be described in relation to a case where the present invention is implemented on a digital camera. However, the present invention is applicable to arbitrary electronic devices with an image capture function. These electronic devices include a video camera, a computer device (e.g., a personal computer, a tablet computer, a media player, and a PDA), a mobile telephone device, a smartphone, a game device, a robot, a drone, and a drive recorder. These are examples, and the present invention is also applicable to other electronic devices.

Figure 1:
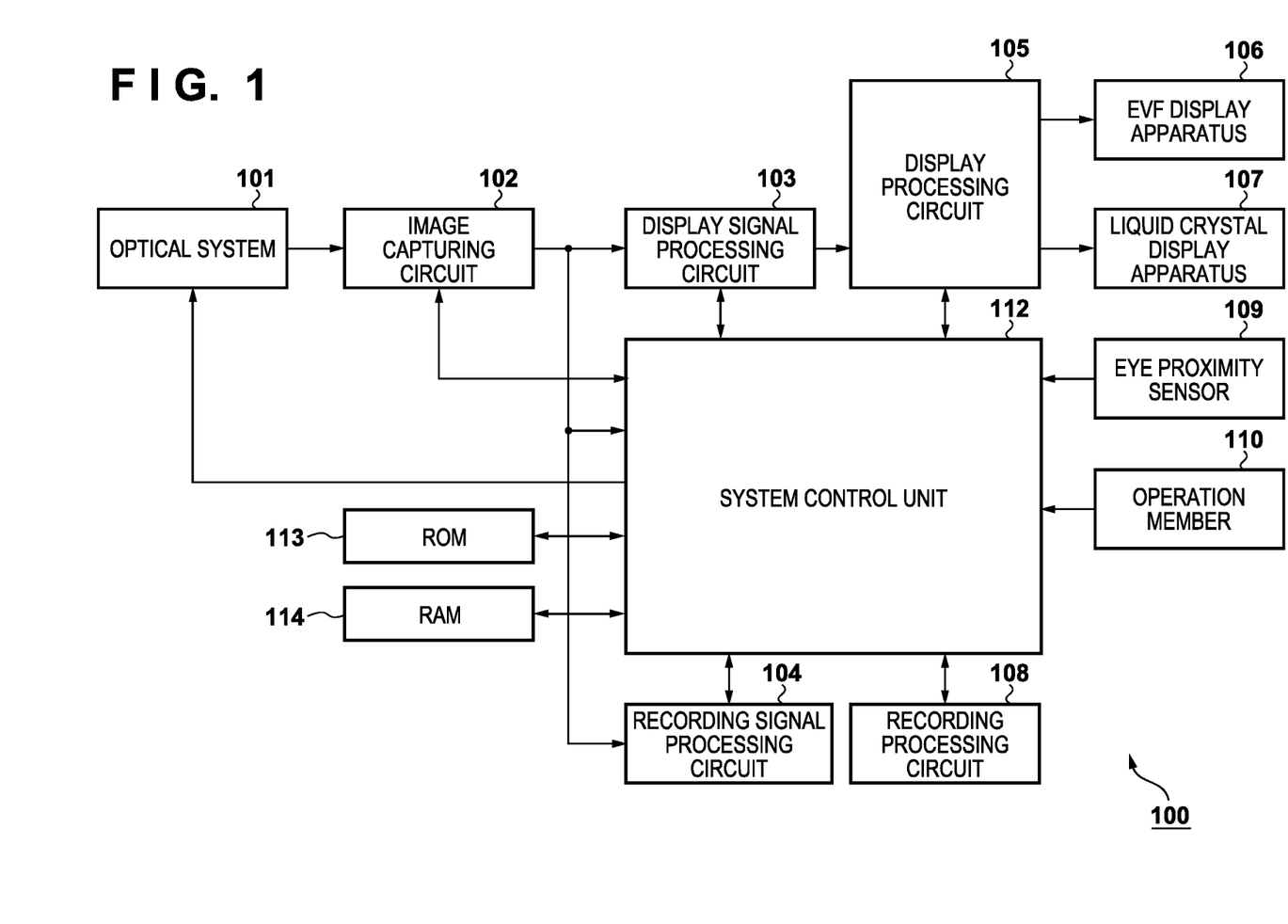
FIG. 1 is a block diagram showing an exemplary functional configuration of a digital camera according to an embodiment of the present invention.

FIG. 1 is a block diagram showing an exemplary functional configuration of a digital camera 100 that serves as an example of an image capture apparatus according to an embodiment of the present invention.

An optical system 101 has a lens assembly that includes such movable lenses as a varifocal lens and a focusing lens, a diaphragm, and a shutter. The optical system 101 forms an optical image of a subject on an image capture plane of an image capture circuit 102.

The image capture circuit 102 includes an image sensor that converts the optical image of the subject formed by the optical system 101 into a group of analog signals, and an A/D converter that converts the group of analog signals output from the image sensor into a group of digital signals (image data). The image sensor may be a known CCD image sensor or CMOS image sensor. Hereinafter, image data output from the image capture circuit 102 is referred to as RAW image data. The RAW image data is output to a display signal processing circuit 103, a recording signal processing circuit 104, and a system control circuit 112.

The display signal processing circuit 103 generates image data for display, with which the exposure and composition are checked, by reducing the resolution of the RAW image data output from the image capture circuit 102 to a display resolution and then applying various types of signal processing. The substance of signal processing applied by the display signal processing circuit 103 is controlled by the settings configured by the system control circuit 112. Here, as the image data for display generated by the display signal processing circuit 103 is high-dynamic-range (HDR) image data, it is referred to as HDR image data for display. The HDR image data for display is output to a display processing circuit 105.

The recording signal processing circuit 104 generates image data for recording by applying various types of signal processing to the RAW image data output from the image capture circuit 102. The substance of signal processing applied by the recording signal processing circuit 104 is controlled by the settings configured by the system control circuit 112. Here, as the image data for recording generated by the recording signal processing circuit 104 is HDR image data, it is referred to as HDR image data for recording. The HDR image data for recording generated by the recording signal processing circuit 104 is output to a recording processing circuit 108 via the system control circuit 112.

Here, the display signal processing circuit 103 and the recording signal processing circuit 104 may apply the same signal processing, but can also apply different types of signal processing. For example, the display signal processing circuit 103 may apply simple signal processing compared to the recording signal processing circuit 104. Here, the simple signal processing means a low processing load, such as a low processing amount and low processing quality, compared to non-simple signal processing. Furthermore, in the same type of processing, the display signal processing circuit 103 and the recording signal processing circuit 104 may use different processing parameters.

For example, both of the display signal processing circuit 103 and the recording signal processing circuit 104 may apply white balance adjustment (WB) processing, color interpolation (debayering) processing, color reproduction processing, sharpness processing, tone mapping processing, and gamma correction processing. On the other hand, only the recording signal processing circuit 104 may apply aberration correction processing, noise reduction processing, and encoding processing of the optical system 101. Note that the types of processing that are exemplarily mentioned here are merely illustrative.

In the present embodiment, it is assumed that the peak luminance that can be displayed by an EVF display apparatus 106 and a liquid crystal display apparatus 107, information related to the peak luminance that can be set, and the settings of signal processing for display according to the peak luminance are stored in, for example, a ROM 113. It is also assumed that whether the display peak luminance of the EVF display apparatus 106 and the liquid crystal display apparatus 107 is reduced during shooting for recording, as well as the EOTF according to the display luminance, is also recorded in the ROM 113. Furthermore, it is assumed that the settings related to signal processing for recording are also stored in the ROM 113. Based on these settings stored in the ROM 113, the system control circuit 112 performs control in relation to the properties of the display apparatuses and signal processing to be applied. Note that the settings stored in the ROM 113 may be changeable by a user's operation performed on a GUI screen via an operation member 110.

The system control circuit 112 can configure the settings and change the settings related to signal processing and display properties with reference to the ROM 113 at a timing at which a preset condition has been met, for example, when a state of depression of a release button has changed. Note that in the present embodiment, it is assumed that the system control circuit 112 stores and manages the currently used settings of signal processing and display properties in a RAM 114.

Note that the display signal processing circuit 103 may apply detection processing and evaluation value calculation processing either during the process of generation of the HDR image data for display or to the generated HDR image data for display. The detection processing includes processing for detecting and tracking a feature region (e.g., a face region, an eye region, a human body region, etc.), person recognition processing, and the like. The evaluation value calculation processing is processing for calculating evaluation values for contrast AF, processing for calculating evaluation values used in automatic exposure control, and the like. Note that these are examples of signal processing that can be applied by the display signal processing circuit 103, and do not limit signal processing that can be applied by the display signal processing circuit 103. Furthermore, at least one of these detection processing and evaluation value calculation processing may be implemented by the system control circuit 112.

The display processing circuit 105 superimposes an OSD (On Screen Display) and the like on the HDR image data for display input from the display signal processing circuit 103, and outputs the resultant HDR image data for display as, for example, a live-view image to the EVF display apparatus 106 and the liquid crystal display apparatus 107.

The liquid crystal display apparatus 107 is a display apparatus that is provided on a surface of a housing of the digital camera 100 and does not include an eyepiece unit. The liquid crystal display apparatus 107 displays the image for display output from the display processing circuit 105. The liquid crystal display apparatus 107 is not limited to a liquid crystal display, and may be an organic EL (electroluminescence) display.

The EVF display apparatus 106 is a display apparatus that is provided inside the housing of the digital camera 100 and includes an eyepiece unit. The EVF display apparatus 106 is composed of a liquid crystal display or an organic EL display, and displays the image output from the display processing circuit 105.

In the present embodiment, whether the user is looking into the eyepiece unit can be detected based on the output from an eye proximity sensor 109. When a state in which the user is looking through the eyepiece unit has been detected based on the output from the eye proximity sensor 109, the display processing circuit 105 may output the image for display to the EVF display apparatus 106 and may not output the image for display to the liquid crystal display apparatus 107. On the other hand, when a state in which the user is looking through the eyepiece unit has not been detected based on the output from the eye proximity sensor 109, the display processing circuit 105 may output the image for display to the liquid crystal display apparatus 107 and may not output the image for display to the EVF display apparatus 106. With this configuration in which the image is displayed only on one of the EVF display apparatus 106 and the liquid crystal display apparatus 107, power consumption can be reduced.

Based on the settings that have been input from the user via an operation performed on the operation member 110, the recording processing circuit 108 records the HDR image data for recording and related information into a recording medium, such as a nonvolatile semiconductor memory card (hereinafter simply referred to as a memory card) and the like. The details of processing of the recording processing circuit 108 will be described later.

The system control circuit 112 is, for example, a CPU (an MPU, also referred to as a microprocessor). The system control circuit 112 controls the behaviors of respective components of the digital camera 100 and realizes the functions of the digital camera 100 by reading a program stored in the ROM 113 into the RAM 114 and executing the program.

The ROM 113 is a rewritable nonvolatile memory, and stores, for example, the program executed by the system control circuit 112, various types of setting values of the digital camera 100 including the settings of signal processing for display and signal processing for recording, and GUI data. The RAM 114 is a main memory that is used when the system control circuit 112 executes the program. In addition, the RAM 114 may be used also to store image data to which signal processing is applied by the display signal processing circuit 103 and the recording signal processing circuit 104.

A part of the behaviors of the system control circuit 112 is execution of automatic exposure control (AE) processing based on evaluation values that have been generated by the display signal processing circuit 103 or by itself, and deciding of shooting conditions. For example, in the case of still image shooting, the shooting conditions are the shutter speed, f-number, and film speed. The system control circuit 112 decides on at least one of the shutter speed, f-number, and film speed in accordance with an AE mode that is currently set. The system control circuit 112 controls the f-number of a diaphragm mechanism of the optical system 101.

Furthermore, as focus adjustment means, the system control circuit 112 performs automatic focus detection (AF) processing of driving the focusing lens of the optical system 101 based on evaluation values or a defocusing amount that has been generated by the display signal processing circuit 103 or by itself, and making the optical system 1 focus on a desired subject.

The operation member 110 is a collective term for a group of input devices that accept a user input. When the liquid crystal display apparatus 107 is a touch display, a touchscreen is included in the operation member 110. The input devices that compose the operation member 110 are given names based on the functions that have been allocated statically or dynamically. Typical examples of the names include a release button, a menu button, directional keys, a set button, a power button, and the like. Upon detecting an operation performed on an input device of the operation member 110, the system control circuit 112 behaves in accordance with the detected operation.

For example, in response to an operation of depressing the release button of the operation member 110 halfway (an instruction for starting a shooting preparation operation), the system control circuit 112 executes shooting preparation processing for a still image. The shooting preparation processing includes AE processing and AF processing. Also, in response to an operation of fully depressing the release button (an instruction for starting shooting), the system control circuit 112 shoots a still image for recording in compliance with the shooting conditions that have been decided on in the AE processing, and executes recording processing.

Figure 2:
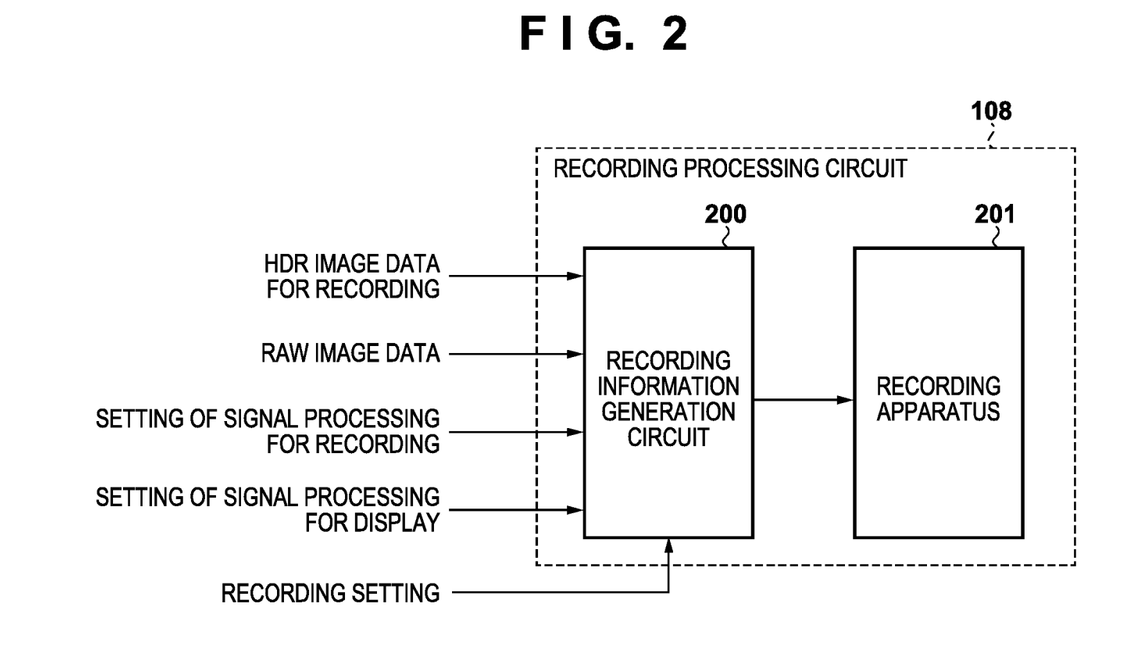
FIG. 2 is a block diagram showing an exemplary functional configuration of a recording processing circuit 108 of FIG. 1.

FIG. 2 is a block diagram showing an exemplary functional configuration of the recording processing circuit 108. The recording processing circuit 108 includes a recording information generation unit 200 and a recording apparatus 201. A description is now given of the behaviors of the recording processing circuit 108 using a flowchart shown in FIG. 3. It is assumed that, as an advance setting, HDR has been selected ahead of time as a recording format of the image capture apparatus 100. Here, it is assumed that a full-depression operation has been detected following a halfway-depression operation with respect to the release button, processing for shooting a still image for recording has been performed, and the recording signal processing circuit 104 has started to generate HDR image data for recording.

Figure 3:
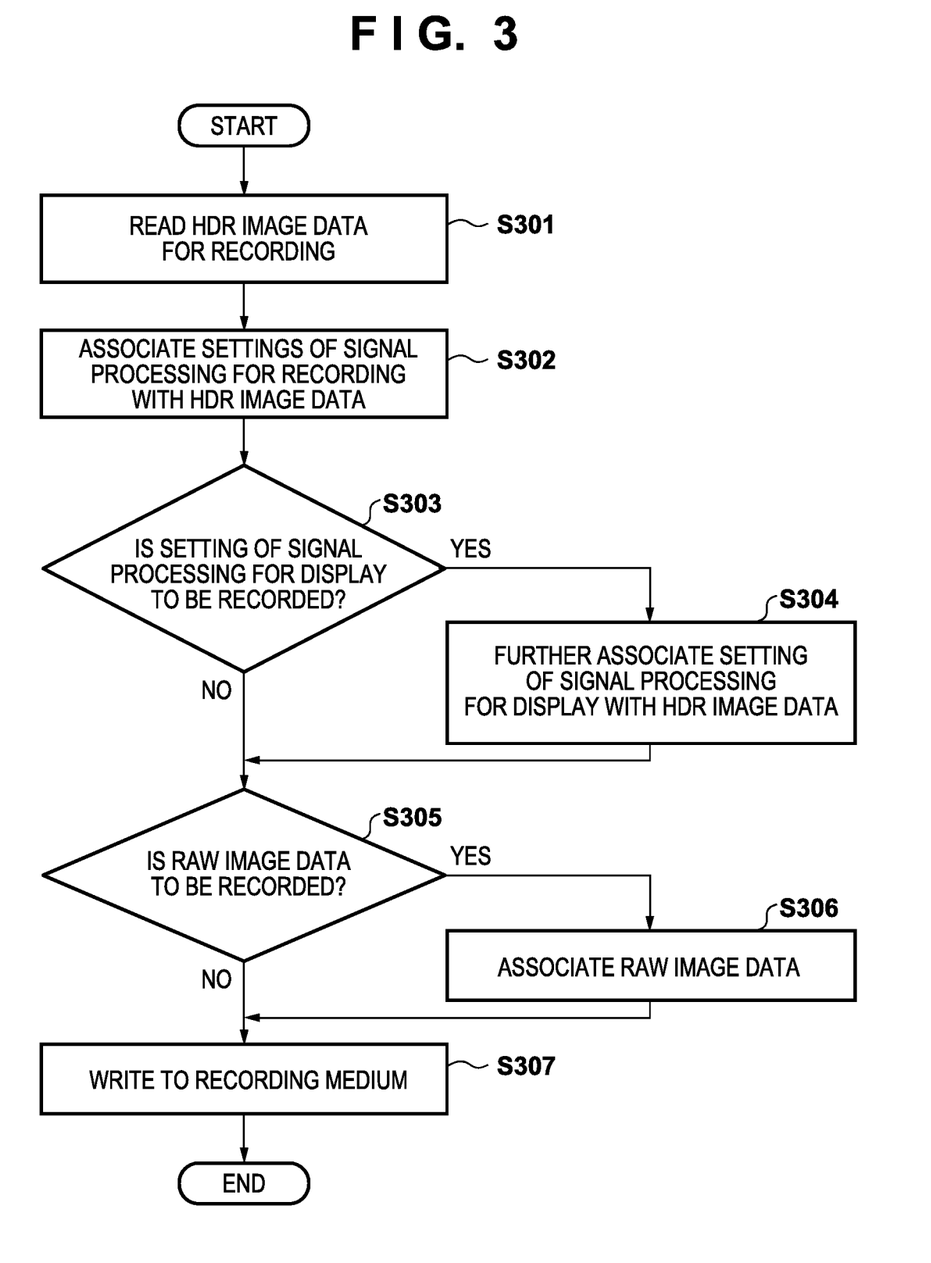
FIG. 3 is a flowchart related to the behaviors of the recording processing circuit 108 in the embodiment.

In step S301, the recording information generation unit 200 obtains the HDR image data for recording, which has been generated by the recording signal processing circuit 104, via the system control circuit 112.

In step S302, the recording information generation unit 200 obtains the settings of signal processing for recording, which are configured in the recording signal processing circuit 104, via the system control circuit 112. Then, the recording information generation unit 200 generates image data for recording by associating the HDR image data for recording with the settings of signal processing for recording. The settings of signal processing for recording include, for example, the settings of the properties of the OETF used in gamma correction processing, tone mapping properties indicating tone properties of brightness, and color reproduction properties. Note that instead of recording the settings per se, information (e.g., numbers and flags) that enables identification of the settings may be recorded.

In step S303, the recording information generation unit 200 checks settings regarding whether to record the settings of signal processing for display. It is assumed that whether to record the settings of signal processing for display has been set, for example, by a user operation via a menu and the like in advance. The recording information generation unit 200 can check whether the setting to record the settings of signal processing for display has been configured by, for example, making an inquiry to the system control circuit 112. The recording information generation unit 200 proceeds to processing of step S304 when the setting to record the settings of signal processing for display has been configured, and proceeds to processing of step S305 when this setting has not been configured.

In step S304, the recording information generation unit 200 obtains the settings of signal processing for display, which are configured in the display signal processing circuit 103, via the system control circuit 112. For example, the system control circuit 112 supplies the current settings stored in the RAM 114 to the recording information generation unit 200. In this way, the setting values of signal processing for display that were used at the time of shooting of an image for recording can be obtained. Note that the system control circuit 112 may obtain the settings of signal processing for display upon accepting a request in step S304. Then, the recording information generation unit 200 generates new image data for recording by further associating the settings of signal processing for display, which are configured in the display signal processing circuit 103, with the HDR image data for recording.

The settings of signal processing for display include, for example, the settings of the properties of the OETF used in gamma correction processing, tone mapping properties indicating tone properties of brightness, and color reproduction properties. Here, at least one of the settings of signal processing for display differs from the settings of signal processing for recording.

For example, when it comes to the properties of the OETF, with respect to signal processing for recording, the OETF with properties that are compatible with a display apparatus having high displayable peak luminance is set. On the other hand, with respect to signal processing for display, the OETF that is compatible with peak luminance that can be displayed on the EVF display apparatus 106 and the liquid crystal display apparatus 107 is set. For example, a property that is the inverse of PQ (Perceptual Quantization) can be set for the former OETF, whereas a property that is the inverse of HLG (Hybrid Log Gamma) can be set for the latter OETF.

As described above, with respect to signal processing for display, the present embodiment uses the settings that are in line with the properties of a display apparatus in which displayable peak luminance is low compared to a general display apparatus that supports HDR. The display apparatuses (the EVF display apparatus 106 and the liquid crystal display apparatus 107) of the digital camera 100, which is driven by a battery, originally have low displayable peak luminance or reduce the peak luminance to reduce power consumption. Therefore, these settings can suppress blown-out highlight of a high-luminance portion when HDR image data is displayed on the digital camera 100.

Furthermore, when it comes to the tone mapping properties, signal processing for recording has settings related to retinex processing, whereas signal processing for display does not have settings related to retinex processing. Retinex processing is processing for improving image visibility based on the retinex theory achieved by modeling the properties of visual perception of human beings.

In the present embodiment, the retinex processing is applied only to signal processing for recording because the retinex processing requires a large amount of computation and storage resources. In signal processing for display, as the retinex processing is not performed, power consumption required in display processing can be reduced.

Furthermore, when it comes to the color reproduction properties, although properties with a large color gamut defined by Rec.2020 are set with respect to signal processing for recording, properties according to a color gamut that can be reproduced on the EVF display apparatus 106 and the liquid crystal display apparatus 107 are set with respect to signal processing for display. Normally, a color gamut that can be reproduced on the EVF display apparatus 106 and the liquid crystal display apparatus 107 is smaller than that of Rec.2020. Therefore, by bringing the settings of color reproducibility in signal processing for display in line with the properties of the EVF display apparatus 106 and the liquid crystal display apparatus 107, a high-saturation subject can be displayed with a color gamut that can be displayed on these display apparatuses.

Note that the settings of signal processing for display that are associated with the HDR image data may not be the substance of the settings per se, and may be information, such as numbers and flags, that enable identification of the substance of the settings. Also, recording may be performed with respect to the settings that differ from the settings of signal processing for recording that were already associated in step S302 (difference information).

In step S305, the recording information generation unit 200 checks settings regarding whether to record RAW image data. The recording information generation unit 200 can check whether to record RAW image data by, for example, making an inquiry to the system control circuit 112. The recording information generation unit 200 proceeds to processing of step S306 when the setting to record RAW image data has been configured, and proceeds to processing of step S307 when this setting has not been configured.

In step S306, the recording information generation unit 200 obtains, from the system control circuit 112, RAW image data that was stored by the system control circuit 112 into, for example, the RAM 114, and generates image data for recording by further associating the RAW image data with the HDR image data for recording.

In step S307, the recording information generation unit 200 outputs the image data for recording to the recording apparatus 201. The recording apparatus 201 records the image data for recording into a recording medium, such as a memory card, and then processing is ended.

Figure 4:
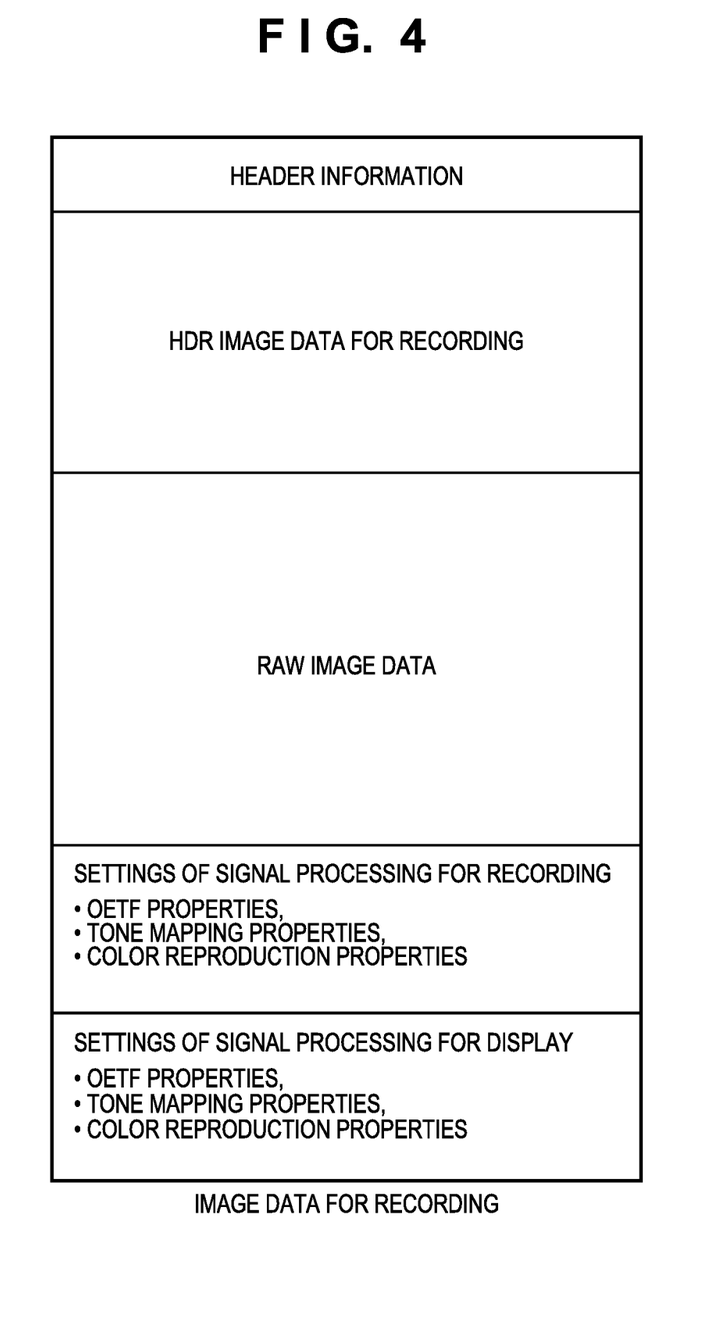
FIG. 4 is a diagram showing an example of a recorded data format of the recording processing circuit 108.

FIG. 4 is a diagram showing an exemplary format of image data for recording. A data file that stores the image data for recording can include, in addition to HDR image data for recording and the settings of signal processing for recording, the settings of signal processing for display and RAW image data in accordance with user settings. A header of the data file includes, in addition to Exif information and the like, information of the types, recording positions, and the like of stored data.

Note that a widely-used data format, such as a JPEG file and a DNG file, may not be used as a data format of a data file recorded in the digital camera of the present embodiment. For example, a dedicated data format that requires dedicated software may be used for display or playback of stored data.

As described above, according to the present embodiment, information related to the settings of signal processing that were used to generate an image for display at the time of shooting of an HDR image for recording can be recorded in association with HDR image data for recording. Therefore, when the HDR image data for recording is displayed on an apparatus that is different from the image capture apparatus, the state of display on the image capture apparatus at the time of shooting of this image can be reproduced. For example, when RAW image data is also recorded in addition to the HDR image data for recording, signal processing can be applied to the RAW image data based on the settings of signal processing for display. By enabling the user to select which of the settings of signal processing for recording and the settings of signal processing for display are to be applied, an image that suits the user's preference can be provided.

By selecting, for example, the settings of signal processing for display, the user can perform image editing in which the image that was displayed on the image capture apparatus at the time of shooting is used as a base. Furthermore, which one of signal processing for recording and signal processing for display is to be applied may be selectable also when the RAW image data is developed again within the image capture apparatus.

Other Embodiments

Note that image data for recording may be recorded in a state where it is associated with the display properties (e.g., the EOTF, display peak luminance, and a color gamut) of the EVF display apparatus 106 and the liquid crystal display apparatus 107 at the time of shooting, in addition to the settings of signal processing. By thus carrying out the recording while associating the properties of the display apparatuses of the image capture apparatus at the time of shooting, a display image can be reproduced in a more faithful manner.

Furthermore, although the present embodiment has been described in relation to the case where HDR image data and RAW image data are recorded, it is also applicable to a case where only RAW image data is recorded. In this case, when the determination in step S303 leads to NO, a RAW data image and the settings of signal processing for recording are recorded in association with each other, and the settings of signal processing for display are not associated. When the determination in step S303 leads to YES, not only the RAW data image and the settings of signal processing for recording, but also the settings of signal processing for display are recorded in association with each other.

Furthermore, although the embodiment has been described above under the assumption that the display signal processing circuit 103 and the recording signal processing circuit 104 have different configurations, it is permissible to use the same circuits and change only the settings of signal processing therein.

Furthermore, when image data recorded in a recording medium is displayed on the digital camera 100, the settings of signal processing for display that are set on the display signal processing circuit 103 at that point may be used instead of the settings of signal processing for display that are recorded in a data file. In this case, the settings of signal processing for recording may be updated based on the settings of signal processing for display.

Furthermore, as an HDR shooting mode that can be selected by the user via the operation member 110, a second mode in which development is performed faithfully to an image for display may be selectable in addition to a conventional shooting mode (first mode). Then, the settings of signal processing for display may be recorded in association with HDR image data only when the second mode is selected. Also, at the time of playback of the HDR image data recorded in the second mode, development processing to which the settings of signal processing for display have been applied may be performed with respect to RAW image data. In addition, at the time of playback, the user may be able to select which of the settings of signal processing for display and the settings of signal processing for recording are to be used in performing development processing.

Although the embodiment has been described above based on recording of HDR image data by way of example, an image to be dealt with is not necessarily limited to the HDR image data, and the embodiment is applicable to a configuration in which development processing for recording and development processing for display differ from each other.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-150597, filed on Aug. 20, 2019, which is hereby incorporated by reference herein in its entirety.

What is claimed is:

1. An image capture apparatus, comprising:
   a first signal processing circuit that generates image data for display by applying signal processing for display based on first settings to image data obtained from an image sensor;
   a second signal processing circuit that generates image data for recording by applying signal processing for recording based on second settings to the image data obtained from the image sensor; and
   a recording circuit that records, in association with the image data for recording, information from which the first settings of the signal processing for display can be identified,
   wherein the first settings of the signal processing for display and the second settings of the signal processing for recording include at least one of properties of an opto-electronic transfer function (OETF), tone mapping properties, and color reproduction properties, and
   wherein at least one of the first settings of signal processing for display differs from the second settings of signal processing for recording.

2. The image capture apparatus according to claim 1, wherein the first signal processing circuit generates the image data for display according to properties of a display apparatus included in the image capture apparatus.

3. The image capture apparatus according to claim 2, wherein
the properties of the display apparatus include peak luminance.

4. The image capture apparatus according to claim 2, wherein
peak luminance of the display apparatus changes according to a setting, and
the first signal processing circuit generates the image data for display according to the peak luminance that is based on the setting.

5. The image capture apparatus according to claim 1, wherein
the recording circuit further records, in association with the image data for recording, information from which the second settings of the signal processing for recording can be identified.

6. The image capture apparatus according to claim 5, wherein
the recording circuit records, as the information from which the first settings of the signal processing for display can be identified, information from which a setting of the signal processing for display that differs from the second settings of the signal processing for recording, can be identified.

7. The image capture apparatus according to claim 5, wherein
when displaying image data that are recorded by the recording circuit on the image capture apparatus, whether to use the second settings of the signal processing for recording or use the first settings of the signal processing for display is selectable.

8. The image capture apparatus according to claim 7, wherein
in a case where the first settings of the signal processing for display are used when displaying image data that are recorded by the recording circuit on the image capture apparatus, settings of the second signal processing circuit are updated based on the first settings of the signal processing for display.

9. The image capture apparatus according to claim 5, wherein
when displaying image data that are recorded by the recording circuit on the image capture apparatus, first settings of the signal processing for display that are currently set on the first signal processing circuit are used instead of the first settings of the signal processing for display that can be identified from the recorded information.

10. The image capture apparatus according to claim 1, wherein
the second signal processing circuit generates the image data for recording according to display properties of a display apparatus that has higher peak luminance than peak luminance of a display apparatus included in the image capture apparatus.

11. The image capture apparatus according to claim 1, wherein
whether to record the information from which the first settings of the signal processing for display can be identified is selectable by a user.

12. The image capture apparatus according to claim 1, wherein
the first signal processing circuit and the second signal processing circuit are capable of generating high-dynamic-range (HDR) image data.

13. A control method for an image capture apparatus, the control method comprising:
generating image data for display by applying signal processing for display based on first settings to image data obtained from an image sensor;
generating image data for recording by applying signal processing for recording based on second settings to the image data obtained from the image sensor; and
recording, in association with the image data for recording, information from which the first settings of the signal processing for display can be identified,
wherein the first settings of the signal processing for display and the second settings of the signal processing for recording include at least one of properties of an opto-electronic transfer function (OETF), tone mapping properties, and color reproduction properties, and
wherein at least one of the first settings of signal processing for display differs from the second settings of signal processing for recording.

14. A non-transitory computer-readable medium that stores a program causing, when executed by a computer included in an image capture apparatus, to perform a control method of the image capture apparatus, the control method comprising:
generating image data for display by applying signal processing for display based on first settings to image data obtained from an image sensor;
generating image data for recording by applying signal processing for recording based on second settings to the image data obtained from the image sensor; and
recording, in association with the image data for recording, information from which the first settings of the signal processing for display can be identified,
wherein the first settings of the signal processing for display and the second settings of the signal processing for recording include at least one of properties of an opto-electronic transfer function (OETF), tone mapping properties, and color reproduction properties, and
wherein at least one of the first settings of signal processing for display differs from the second settings of signal processing for recording.

* * * * *